United States Patent Office.

GEORGE HEIM, OF NAPERVILLE, ILLINOIS.*

Letters Patent No. 95,226, dated September 28, 1869.

IMPROVED COMPOUND FOR BUILDING-PURPOSES.

The Schedule referred to in these Letters Patent and making part of the same.

To all whom it may concern:

Be it known that I, GEORGE HEIM, of Naperville, in the county of Du Page, and State of Illinois, have invented a new and useful "Improved Compound for Building-Purposes;" and I do hereby declare the following to be a full, clear, and exact description of the same.

The nature of my invention consists in the addition of sand, as hereafter fully described, to the "compound for building-purposes," for which I obtained Letters Patent, dated 27th day of April, 1869; and It also further consists in a composition composed of coal-tar, resin, and coal-dust, prepared as hereafter described, with which to coat over the above-described building-material, when it is put upon roofs.

To enable those skilled in the art to understand how to manufacture and use my invention, I will proceed to describe the same with particularity.

I take coal-ashes, coal-dust, or pulverized coal, and common sand, in about equal quantities. I also use lime, ordinarily about one-fifth the quantity of either of the above-named ingredients, and about the same quantity of water, lime, or cement, as I use of quick-lime. I also use about the same quantity of hair used in ordinary plaster, adding, to the compound, some plaster of Paris.

The compound is prepared, by first slaking the lime with water, and then putting in the coal-ashes, coal-dust, and sand, till it is thickened to the consistency of common plaster.

If large quantities are made up at a time, the cement is not put in the whole batch at one time, as it would harden before it could be used, but it is mixed with smaller quantities, in about the proportions above specified, as it is being used.

The hair is mixed in the whole batch, in about the same quantities as is used in common plaster.

There is added to the compound, while it is being prepared, about one-tenth as much plaster of Paris as is used of coal-ashes.

The above compound is used on sides of buildings, or for roofs, the building first being lathed to receive a coat of the compound.

The compound may also be moulded in blocks and dried, when it hardens and answers as a substitute for brick or stone.

When it is used on the roof of a building, I coat it over with a preparation of coal-tar, coal-dust, and resin, prepared as follows, viz:

To two pails of coal-tar, I add one peck of coal-dust and one quart of resin, and boil the same till it is dissolved, when it is ready for use.

This preparation is put upon the above compound upon the roof, before it is dry, so that it will adhere to it and form an impervious coating.

Having fully described the manufacture and use of my invention,

What I claim, and desire to secure by Letters Patent, is—

1. The above-described compound, composed of the ingredients substantially as, and in the proportions specified.

2. In combination with the above compound, the preparation composed of the ingredients substantially as specified, to form a coating, as described.

GEORGE HEIM.

Witnesses:
JAS. G. WRIGHT,
DANL. N. GROSS.

*Assignor to himself & John Ruchty of same place.